(12) United States Patent
King et al.

(10) Patent No.: US 12,724,760 B2
(45) Date of Patent: Sep. 1, 2026

(54) METHODS AND RELATED DEVICES FOR STORING AND ACCESSING DATA USING MULTI-LEVEL FRACTAL GRIDS

(71) Applicants: Rodney Kuhn Haffnerson King, Clovis, CA (US); Ecy Femi King, Clovis, CA (US)

(72) Inventors: Rodney Kuhn Haffnerson King, Clovis, CA (US); Ecy Femi King, Clovis, CA (US)

( * ) Notice: Subject to any disclaimer, the term of this patent is extended or adjusted under 35 U.S.C. 154(b) by 204 days.

(21) Appl. No.: 18/244,822

(22) Filed: Sep. 11, 2023

(65) Prior Publication Data

US 2024/0095226 A1 Mar. 21, 2024

Related U.S. Application Data

(60) Provisional application No. 63/406,940, filed on Sep. 15, 2022.

(51) Int. Cl.

*G06F 16/22* (2019.01)
*G06F 16/25* (2019.01)
*G06F 16/26* (2019.01)

(52) U.S. Cl.

CPC ........ *G06F 16/2264* (2019.01); *G06F 16/258* (2019.01); *G06F 16/26* (2019.01)

(58) Field of Classification Search

CPC ..... G06F 16/2264; G06F 16/26; G06F 16/258
See application file for complete search history.

(56) References Cited

U.S. PATENT DOCUMENTS 5,673,217 A * 9/1997 Imaizumi .............. G06F 40/274 715/227
6,628,304 B2 * 9/2003 Mitchell ............... G06F 3/0481 715/734
6,640,015 B1 * 10/2003 Lafruit ................... H04N 19/42 708/401
6,789,054 B1 * 9/2004 Makhlouf ................. G06F 8/10 703/22
7,379,944 B2 * 5/2008 Adler .................. G06F 16/2246 707/696
10,386,271 B1 * 8/2019 King ................... G01M 99/005
11,816,618 B1 * 11/2023 Cheek, Jr. ................. G06F 9/54
11,983,534 B2 * 5/2024 Chen ................... G06F 9/30079
2003/0088843 A1 * 5/2003 Mehrotra .............. G06F 30/394 716/130
2006/0129529 A1 * 6/2006 Adler .................... G06F 16/283
2007/0271249 A1 * 11/2007 Cragun ................. G06F 16/221
2008/0069480 A1 * 3/2008 Aarabi ................ G06F 16/5854 707/E17.031

(Continued)

OTHER PUBLICATIONS

Z. Zhang, Y. Y. Zhao, L. J. Duan, A. G. Qiu, F. H. Zhang and K. W. Tao, "A Multi-level Grid Partition Method for Enterprises Distribution Data," 2013 International Conference on Information Science and Cloud Computing Companion, Guangzhou, China, 2013, pp. 686-691, doi: 10.1109/ISCC-C.2013.22. (Year: 2013).*

*Primary Examiner* — Mark E Hershley
(74) *Attorney, Agent, or Firm* — CAPITAL PATENT & TRADEMARK LAW FIRM, PLC

(57) ABSTRACT

Multi-level fractal grids allow users to store and access data. Certain cells within a grid may be configured to store two different sets of data that may be represented as two different "sides", thus enhancing the grid's usage for storing text (e.g., reminders, classroom notes, and/or instructions).

10 Claims, 13 Drawing Sheets

(56) References Cited

U.S. PATENT DOCUMENTS

| | | | | |
|---|---|---|---|---|
| 2009/0019348 | A1* | 1/2009 | King | G06F 16/904 715/833 |
| 2009/0254572 | A1* | 10/2009 | Redlich | G06Q 10/10 |
| 2011/0145753 | A1* | 6/2011 | Prakash | G06F 3/04812 715/783 |
| 2012/0316696 | A1* | 12/2012 | Boardman | H02J 13/1323 700/297 |
| 2015/0113379 | A1* | 4/2015 | Wakefield | G06F 30/20 715/227 |
| 2015/0120719 | A1* | 4/2015 | Aarabi | G06F 16/5838 707/728 |
| 2015/0261890 | A1* | 9/2015 | Mattson | G06V 10/44 703/1 |
| 2016/0289738 | A1* | 10/2016 | Grosveld | C12Q 1/6806 |
| 2019/0340273 | A1* | 11/2019 | Raman | G06F 11/2007 |
| 2020/0272628 | A1* | 8/2020 | Dageville | G06F 16/221 |
| 2020/0272638 | A1* | 8/2020 | Motivala | G06F 16/278 |
| 2021/0124858 | A1* | 4/2021 | Morgan | G06F 30/23 |
| 2021/0216511 | A1* | 7/2021 | Ranchal | G06F 16/1748 |
| 2021/0407170 | A1* | 12/2021 | Clark | G06T 15/06 |
| 2022/0318224 | A1* | 10/2022 | Thompson | G06V 30/414 |
| 2023/0237113 | A1* | 7/2023 | Wang | G06F 16/9537 707/746 |
| 2024/0095226 | A1* | 3/2024 | King | G06F 16/258 |
| 2024/0320204 | A1* | 9/2024 | Agrawal | G06F 16/2264 |
| 2024/0394637 | A1* | 11/2024 | Jin | G06Q 10/067 |

* cited by examiner

ZOOM IN
(DETAILS/ WORM'S EYE VIEW; DECONSTRUCTION)

VERTICAL FRACTAL GRID

ZOOM OUT
(BIG PICTURE/BIRD'S EYE VIEW; CONSTRUCTION)
d0
P0
8
LEVEL 0
(1x1 FG: 1 CELL;
P 1
P 2
P 3
P 4
P 5
P 6
P 7
P 8
9
LEVEL 1
(3x3 FG: 9 CELLS;
Q1
Q2
Q3
Q0
Q5
10
Q4
Q6
Q7
Q8
m 11
m 12
m 13
m 14
m 15
m 16
m 17
m 18
m 21
m 22
m 23
m 24
m 25
m 26
m 27
m 28
S
LEVEL 2
(9x9 FG: 81 CELLS;
11

HORIZONTAL FRACTAL GRID

ZOOM IN
(DETAILS/ WORM'S EYE VIEW; DECONSTRUCTION)

ZOOM OUT
(BIG PICTURE/BIRD'S EYE VIEW; CONSTRUCTION)
SUN (S)
d0
P0
8
P 1
P 2
P 3
P 4
P 5
P 6
P 7
P 8
9
Q0
Q1
Q2
Q3
Q4
Q5
Q6
Q7
Q8
13
S
P 9
P 10
P 11
P 12
P 13
P 14
P 15
P 16
P 17
P 18
P 19
P 20
P 21
P 22
P 23
P 24
P 25
P 26
P 27
P 28
LEVEL 0
(1x1 FG: 1 CELL;
LEVEL 1
(3x3 FG: 9 CELLS;
LEVEL 2
(9x9 FG: 81 CELLS;
12

LEVEL
2
1
0
14
$c_{REF}$
$d_{S_2}$
$S_2$
15

LEVEL
2
1
0
14
$c_{REF}$
$d_{S_1}$
$S_1$
15

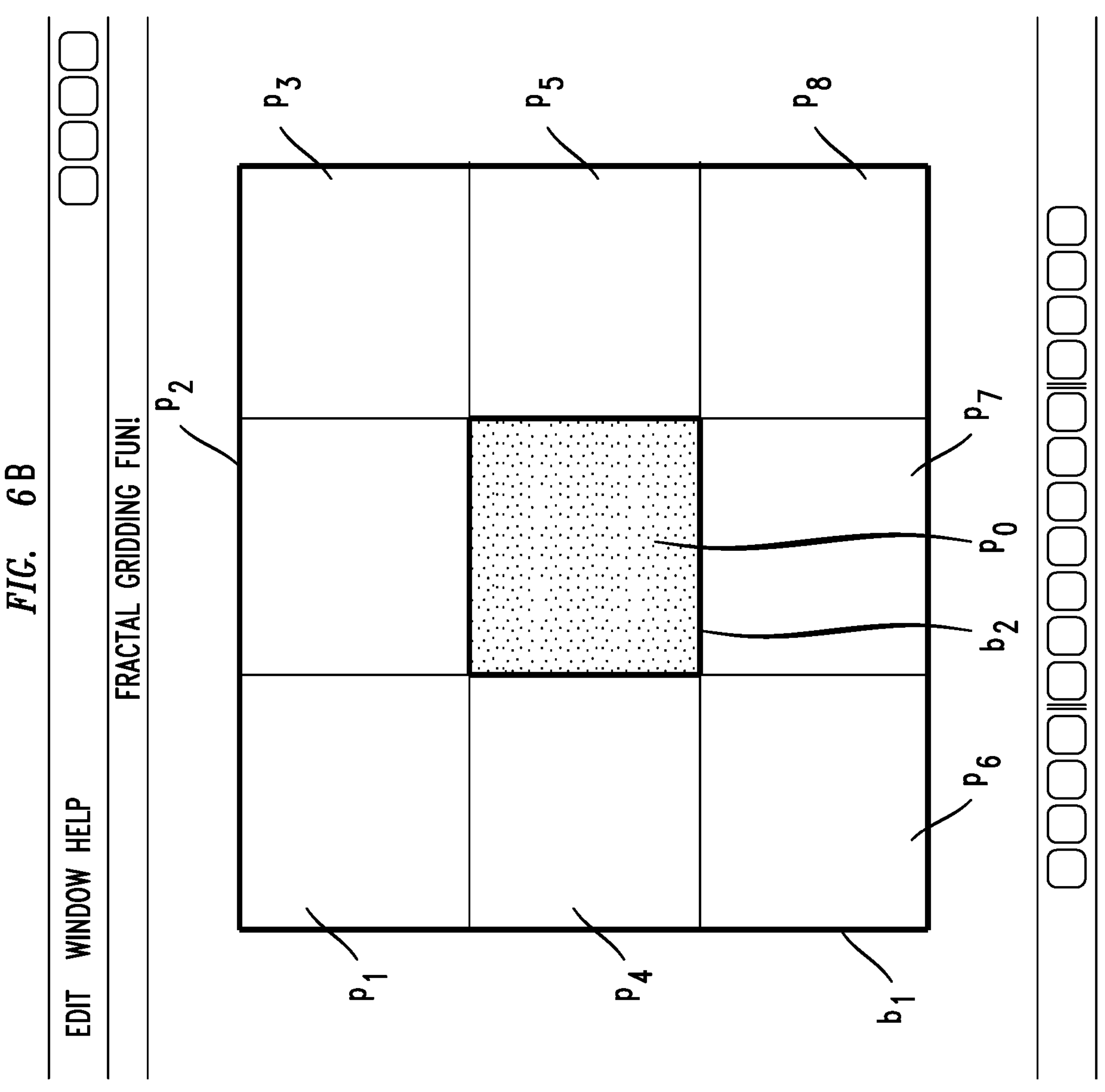
*FIG.* 6B

EDIT WINDOW HELP
FRACTAL GRIDDING FUN!
$b_4$
$b_2$
$b_4$
$b_2$
$b_2$
$b_3$
$b_3$
$b_1$

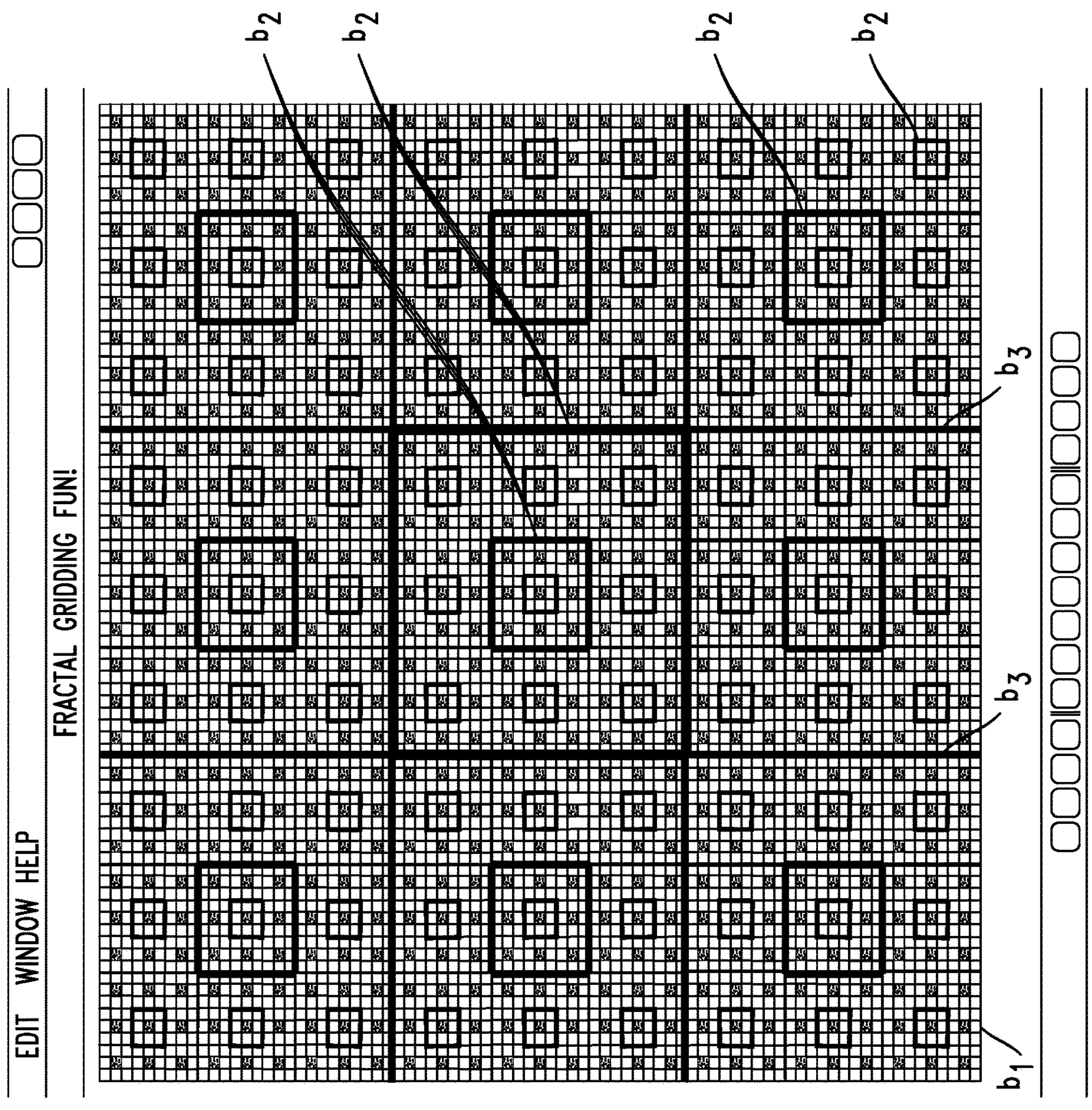
*FIG.* 6E

FIG. 6G

EDIT WINDOW HELP

Menger Mode: OFF Flashcard Mode: OFF

METHODS AND RELATED DEVICES FOR STORING AND ACCESSING DATA USING MULTI-LEVEL FRACTAL GRIDS

RELATED APPLICATION

This application claims priority to U.S. Provisional Application No. 63/406,940 filed Sep. 15, 2022 (the "'940 Application"). This application incorporates by reference the entire disclosures of the '940 Application as well as the entire disclosures of U.S. Non-Provisional application Ser. No. 11/931,539 (the "'539 Application").

TECHNICAL FIELD

This disclosure relates to the field of data storage and access, and particularly, to methods and related systems that use multi-level fractal grids to store and access data.

INTRODUCTION

This section introduces aspects that may help facilitate understanding of the disclosure. Accordingly, the statements of this section are to be read in this light and are not to be understood as admissions about what is, or what is not, prior art.

It is desirable to provide innovative methods and devices to store significant amounts of data that can be readily retrieved and viewed.

SUMMARY

The inventors describe methods and related systems for storing, displaying and accessing data using multi-level fractal grids.

In an embodiment, a method of displaying a plurality of data in a multi-level fractal grid stored within an electronic storage device may comprise at least: changing the format of first data of the plurality of data within a level of the multi-level fractal grid, moving second data of the plurality of data within a first cell or cells of an entire first quadrant of the level to second cell or cells within a second quadrant of the same level; and selecting third data of the plurality of data within a third cell to display different data that is associated with the same, third cell.

Such a method may further comprise (i) generating an outer boundary of a specified level of the multi-level fractal grid, and/or (ii) enhancing or emphasizing the outer boundary; and/or (iii) computing a length and width of an area to be displayed within an outer boundary of a specified level of the multi-level fractal grid; and/or (iv) for the specified level, dividing the area into portions to accommodate a number of cells that correspond to specified level; and/or (v) enhancing or emphasizing horizontal and vertical lines of a central cell of the number of cells that correspond to the specified level; and/or (vi) enhancing or emphasizing one or more horizontal and vertical boundary lines separating the number of cells of the specified level; and/or (vii) adding a color to one or more of the cells that are separated by the boundary lines, wherein each color remains associated with a respective cell separated by the boundary lines as the cell is displayed in different levels of the multi-level fractal grid.

In addition to innovative methods, the inventors also provide innovative devise, systems and apparatuses. One such device may be an electronic storage device configured to store a plurality of electronic data in a multi-level fractal grid, where the grid comprises at least a plurality of cells configured as one or more quadrants of a level of the multi-level fractal grid, and where each cell stores a plurality of different electronic data.

Further, in such an electronic storage device the level may comprise first and second sides and the first and second sides may each comprise a same number of side cells, where electronic data within one or more side cells of the first side differs from electronic data within one or more side cells of the second side. Alternatively, in the electronic storage device the level may comprise first and second sides and the first and second sides may each comprise a same number of side cells, where electronic data within one or more side cells of the first side is the same as electronic data within one or more side cells of the second side.

Yet further, the inventors provide additional methods for storing data in a multi-level, fractal grid. On such method may comprise receiving data input by a user at an electronic storage device; and sending the input data to at least two different editor arrays in the electronic storage device where a first editor array of the arrays stores data of the input data associated with a first side of a side cell and a second editor array of the arrays stores data of the input data associated with a second side of the same side cell.

In this additional method the first and second editor arrays may be configured as a representation of the multi-level, fractal grid to allow a plurality of the input data to be accessed as one portable array. Further, the first and second editor arrays may each comprise a plurality of sub-arrays, where the plurality of sub-arrays may comprise inner arrays configured to store the input data that allows a user to concurrently change the stored data in an outer cell and an inner center cell.

The inventive methods and corresponding devices described above are just some of the inventive methods and devices that will be apparent from the discussion herein.

BRIEF DESCRIPTION OF THE DRAWINGS

The present invention is illustrated by way of example and is not limited by the accompanying figures in which like reference numerals indicate similar elements and in which:

FIGS. 6A to 6G depict exemplary levels of fractal grids where one or more boundaries have been enhanced or emphasized according to embodiments of the present disclosure.

Figure 1:
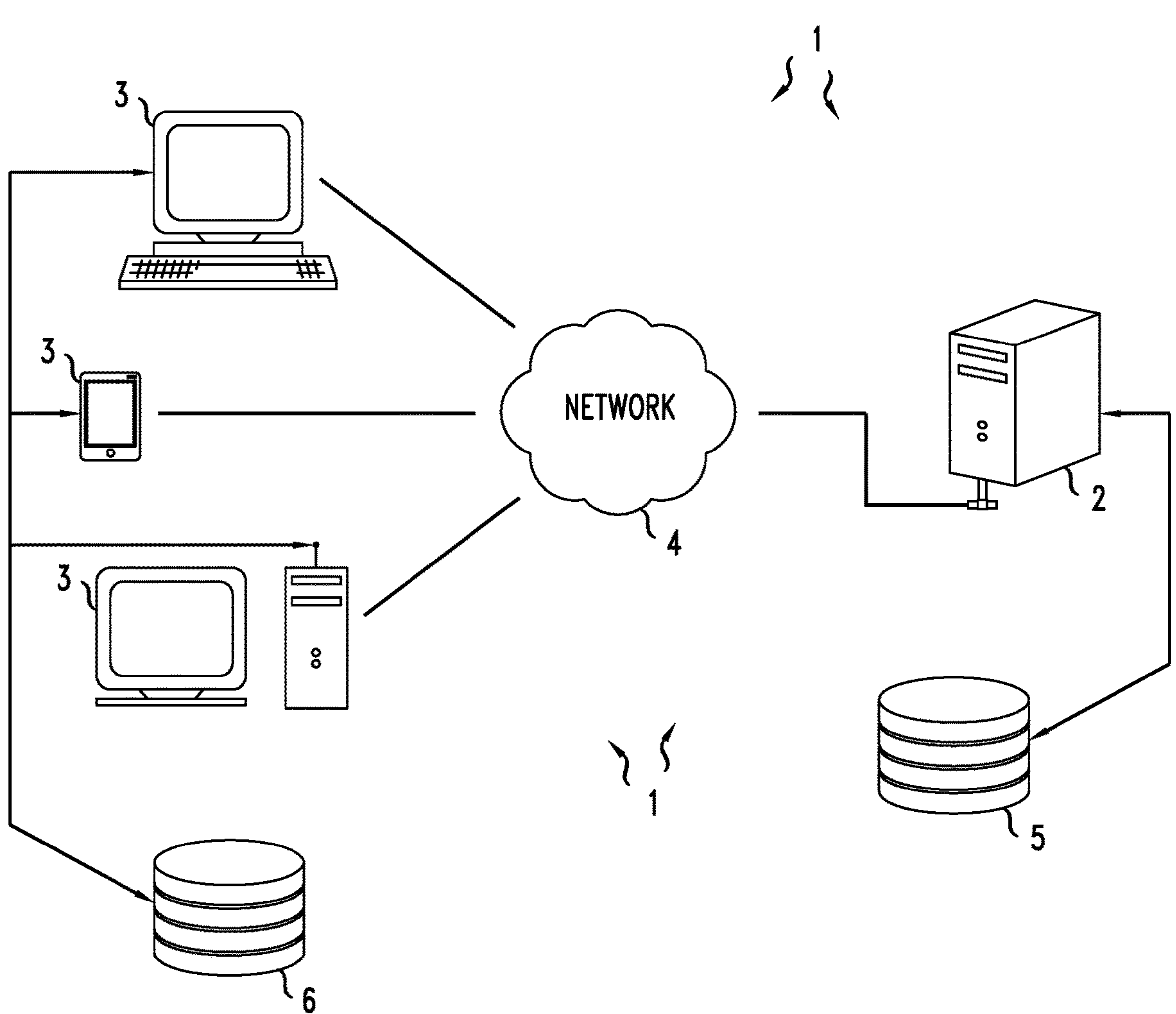
FIG. 1 depicts a simplified block diagram of an exemplary network according to embodiments of the present disclosure.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a clearer presentation of embodiments may be achieved.

Simplicity and clarity in both illustration and description are sought to effectively enable a person of skill in the art to make, use, and best practice the present invention in view of what is already known in the art. One skilled in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EXEMPLARY EMBODIMENTS

The detailed description that follows describes exemplary embodiments and is not intended to be limited to the expressly disclosed combination(s). Therefore, unless otherwise noted, features disclosed herein may be combined to form additional combinations that were not otherwise shown for purposes of brevity.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

As used herein and in the appended claims, the term "comprises," "comprising," or variations thereof are intended to refer to a non-exclusive inclusion, such that a process, method, article of manufacture, or device (e.g., an electronic storage device, electronic server, database, desktop computer, laptop computer, iPad) that comprises a list of elements does not include only those elements in the list, but may include other elements not expressly listed or inherent to such process, method, device, article of manufacture, or apparatus.

The terms "a" or "an", as used herein, are defined as one, or more than one. The term "plurality", as used herein, is defined as two, or more than two. The term "another", as used herein, is defined as at least a second or more.

Unless otherwise indicated herein, the use of relational terms, if any, such as "first", "second", "third", "fourth", and the like are used solely to distinguish one element (e.g., data, cell, quadrant) from another element without necessarily requiring or implying any order or importance regarding such elements.

The terms "including" and/or "having", as used herein, are defined as comprising (i.e., open language).

As used herein the phrase "operable to" or "configured to" mean "functions to" unless the context or knowledge of one skilled in the art indicates otherwise.

Similar reference numbers may denote similar components and/or features throughout the attached drawings.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

It will be appreciated that functions, features and steps depicted and described herein may be implemented in software (e.g., via implementation of software on one or more processors, for executing instructions on a general purpose computer (e.g., via execution of instructions by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions, features and steps discussed herein as software methods may be implemented within hardware, for example, as circuitry that cooperates with the processor to perform various functions, features and/or steps. Portions of the functions, features and steps described herein may be implemented as a computer program product wherein computer instructions, when processed and executed by a computer, adapt the operation of the computer such that the functions, features and/or steps described herein are invoked or otherwise provided. Executable instructions for invoking the various functions, features and/or steps may be stored in fixed or removable media (e.g., non-transitory computer-readable media), transmitted via a data stream in a broadcast or other signal bearing medium, and/or stored within a memory within a computing device operating according to executable instructions.

By "processor" is meant an electronic processor such as a central processing unit, graphics processing unit, microprocessor, ASIC, and/or other electronic processor capable of processing a significant amount of data (e.g., up to the terabyte range). The processor may execute electronic instructions stored in electronic memory (herein referred to as "executable instructions") that, when executed, cause the processor (or device that the processor is a part of) to complete one or more functions, features or steps. Such executable instructions may be structured into groups or sets of instructions that when executed, complete a specific innovative function, step or functions or steps according to embodiments of the disclosure.

As used herein "data" includes at least text, audio, video, image information, Internet links, and/or computer code.

"Triggering" executable instructions means, for example, causing the execution of a set of stored, electronic instructions to complete a function, feature or a method step. In some embodiments a user may cause the triggering of executable instructions by using input devices (keyboard, mouse, graphical user interface (GUI), spoken commands).

The terms "exemplary" or "embodiment" man one non-limiting example of the present disclosure.

FIG. 1 depicts an exemplary network 1 comprising one or more electronic network devices 2 and one or more electronic client devices 3 that may be connected together via well-known wired or wireless, network communication mediums 4, such as over the air radio-frequency mediums, optical fiber, copper wire, etc., to name just a few of the types of mediums. In an embodiment, each of the network and client devices 2, 3 may include one or more processors operable to retrieve executable instructions stored in their electronic memory (not shown) in order to cause the processor(s) and/or devices 2, 3 to complete the processing steps and/or functions described herein.

Further, each of the network devices 2 and client devices 3 may be further connected to one or more local, electronic data storage devices 5, 6 (e.g., a database, server, Web server, and/or combination thereof such as a Reactis® or Google® database//server) operable to store data via local, wired or wireless communication mediums 7, such as Ethernet cables, coaxial cables, optical fiber, or twisted pair, copper wire, or wireless mediums to name just a few of the types of mediums. The one or more local, electronic data storage devices 5, 6 may comprise electronic databases, electronic hard drives, on-board hardware memory and/or removable memory devices (e.g., thumb drives, optical discs) to name just a few of the types of local, electronic data storage devices 5, 6.

In an embodiment, each of the local, electronic data storage devices 5, 6 may be configured to receive and/or store a plurality of electronic data configured as multi-level fractal grids or allow access to such data to output and display such data as explained in more detail herein.

We turn first to a description of an exemplary structure of multi-level fractal grids that may be configured to store data within devices 5, 6, for example (or in internal memories of devices 2, 3).

Figures 2A, 2B, 2C:
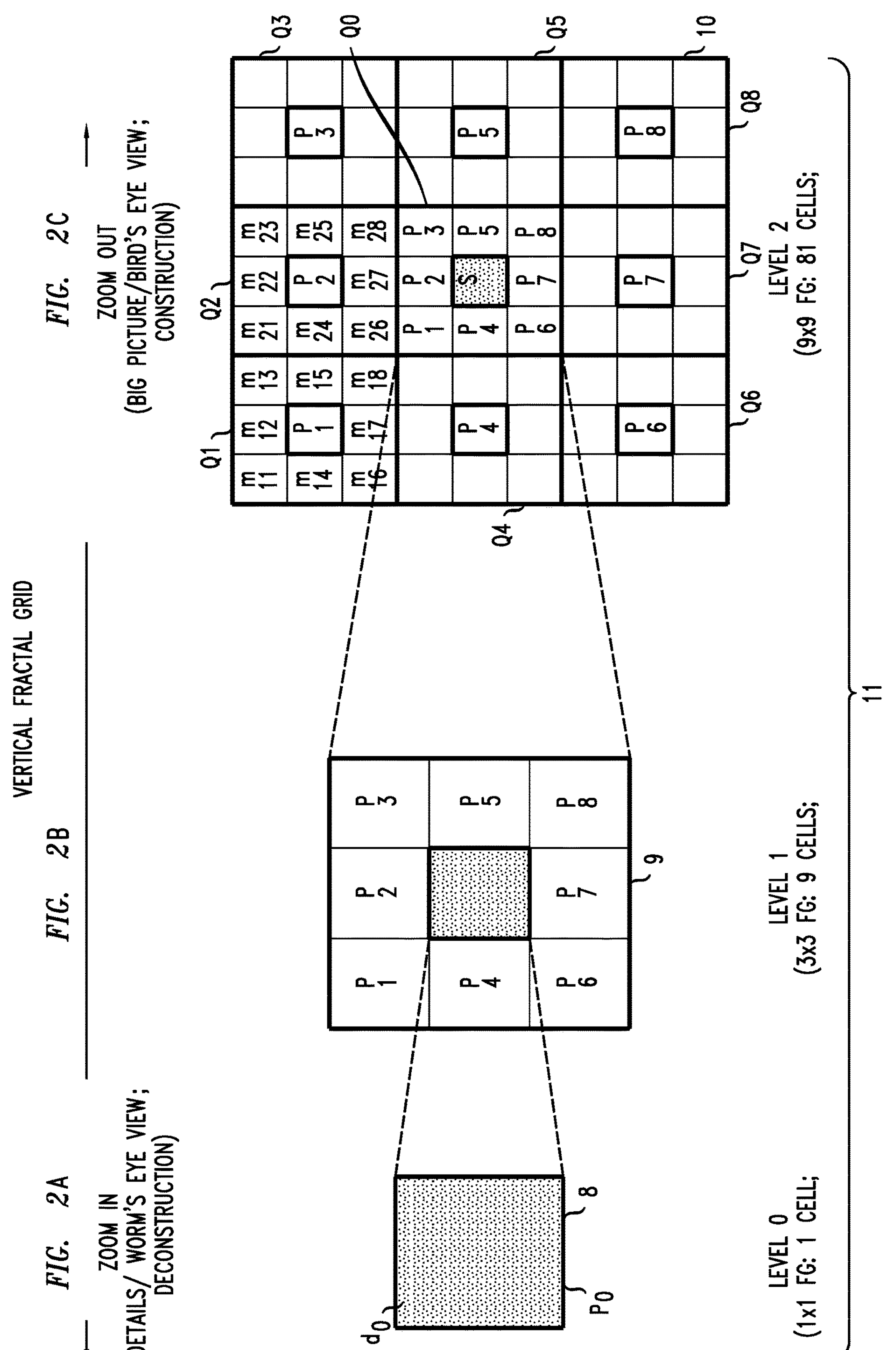
FIGS. 2A to 2C depict exemplary, two-dimensional representations of levels of an innovative, multi-level vertically configured, fractal grid that may be stored within an electronic storage device according to embodiments of the present disclosure.

Referring now to FIGS. 2A to 2C there are depicted two-dimensional representations of levels of an innovative, vertically configured multi-level fractal grid 11 that may be configured and stored within an electronic storage device 5, 6. As configured, the device 5, 6 may be configured to permit the electronic storage of, access to, and/or retrieval of a plurality of data $d_0$ configured as a multi-level, vertically-configured or oriented fractal grid 11. In FIGS. 2A to 2C, the storage device 5, 6 may have been configured by the one or more network or client devices 2, 3 (or another electronic device), for example, to store data as a vertically-configured, multi-level fractal grid, namely, three grid levels labeled 8, 9 and 10, for example, though this is merely exemplary. Theoretically, exemplary storage devices 5, 6 may be configured into an infinite number of grid levels, though to date the inventors have developed experimental storage devices configured with up to at least six vertically oriented fractal grid levels.

For purposes of explanation only, we refer to the three levels as Level 0, Level 1 and Level 2 (labeled 8, 9 and 10). In an embodiment, once stored, all of the data $d_0$ stored within a device 5, 6 may be accessed using a primary cell $p_0$ within Level 0 using means known in the art, such as inputting a number "0" into the client or network device 2, 3 via known input means (e.g., mouse, GUI, key board, touch screen, or voice interface) upon which the one or more processors within a respective device 2, 3 may be operable to retrieve executable instructions in order to access and retrieve so configured data that corresponds to the specified Level of a multi-level fractal grid (e.g., Level 0) from electronic storage devices 5, 6 and display the data that corresponds to the specified Level on a display associated with devices 2, 3 (e.g. if they want data corresponding to level 0 displayed, then "0" is specified and input into device 2, 3).

Further, to access subsets of the data $d_0$ a user may access a different level than Level 0, such as Levels 1 or 2 (labeled 9 or 10). As shown in FIG. 2B, the next iterative level is Level 1 (labeled 9) which may have been configured to be structured (e.g., by one or more processors within device 2, 3) as nine exemplary cells $p_0$ to $p_8$ for storing data. In an embodiment, cells $p_1$ to $p_8$ may be referred to as "sub-level" cells, where each sub-level cell $p_1$ to $p_8$ may be configured to store a subset $d_1$ to $d_8$ of data $d_0$ derived from primary central cell $p_0$.

Referring now to FIG. 2C, there is depicted an exemplary Level 2 (labeled 10) configured to be structured as nine different quadrants $Q_0$ to $Q_8$ totaling eighty-one exemplary cells for storing data (e.g., again, via one or more processors within device 2, 3). In an embodiment, the central quadrant $Q_0$ in Level 2 may be structured to contain cells $p_0$ to $p_8$ that are similar to Level 1 while the other eight quadrants $Q_1$ to $Q_8$ may be configured to be structured with a sub-level cell $p_1$ to $p_8$ as a central cell. In effect, in Level 2, a sub-level cell $p_1$ to $p_8$ may function as a primary cell within its respective quadrant $Q_1$ to $Q_8$.

Accordingly, in Level 2 of an exemplary vertically configured, multi-level fractal grid the eight cells within the same quadrant $Q_1$ to $Q_8$ as a sub-level cell $p_1$ to $p_8$ may be configured to store a subset of data derived from a respective, sub-level cell $p_1$ to $p_8$.

For example, quadrant $Q_1$ may be structured to comprise sub-level cell $p_1$ and eight additional cells $m_{11}$ to $m_{18}$. Thus, the eight additional cells $m_{11}$ to $m_{18}$ may be configured to store a subset of data derived from a respective, sub-level cell $p_1$.

Figures 3A, 3B, 3C:
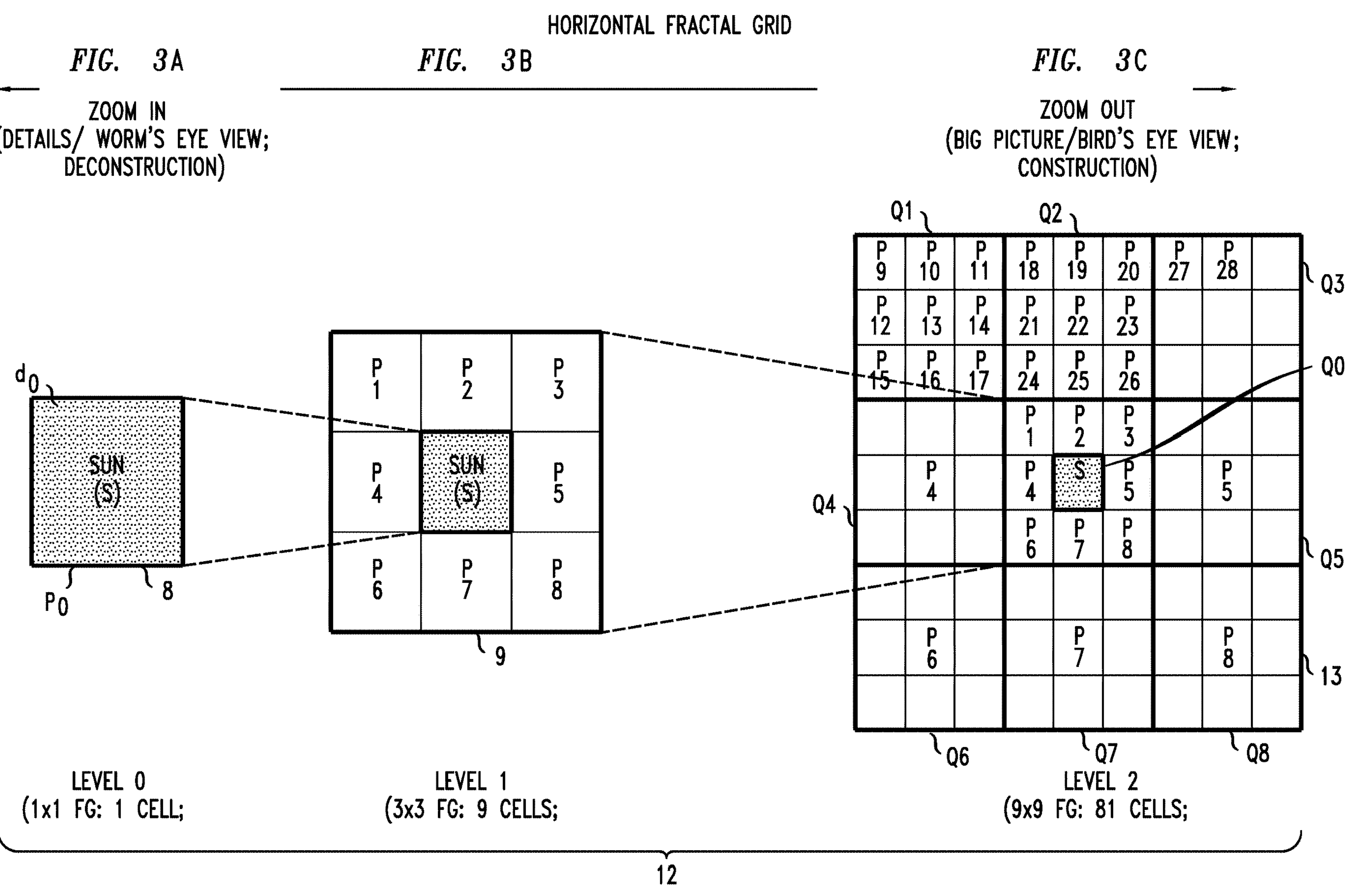
FIGS. 3A to 3C depict exemplary, two-dimensional representations of levels of an innovative, multi-level horizontally configured, fractal grid that may be stored within an electronic storage device according to embodiments of the present disclosure.

Referring now to FIGS. 3A to 3C there are depicted two-dimensional representations of levels of an innovative, horizontally configured multi-level fractal grid 12 that may be configured and stored within an electronic storage device 5, 6. In an embodiment, Levels 0 and 1 of the exemplary, horizontally configured multi-level fractal grid 12 may be similar to Levels 0 and 1 of the exemplary, vertically configured multi-level fractal grid 11 described previously. However, level 2 (labeled 13) may be configured differently than a vertically configured, multi-level fractal grid.

In an embodiment, and referring now to FIG. 3C, there is depicted an exemplary Level 2 (labeled 13) of the horizontally configured, multi-level fractal grid 12. As depicted Level 2 may be configured to be structured as nine different quadrants $Q_0$ to $Q_8$ totaling eighty-one exemplary cells for storing data. In an embodiment, the central quadrant $Q_0$ in Level 2 may contain cells $p_0$ to $p_8$ that are similar to Level 1 while the other eight quadrants $Q_1$ to $Q_8$ are now configured to be structured with additional sub-level cells $p_9$ to $p_{81}$. In effect, in Level 2, rather than establish a sub-level cell $p_1$ to $p_8$ as a primary cell within a respective quadrant $Q_1$ to $Q_8$. as is done in a vertically configured, multi-level fractal grid, additional sub-level cells $p_9$ to $p_{81}$ are added to the grid. In an embodiment, additional sub-level cells $p_9$ to $p_{81}$ within each quadrant $Q_1$ to Qs may be configured and structured to store a subset $d_9$ to $d_{81}$ of data $d_0$ derived from primary central cell $p_0$.

For example, quadrant $Q_1$ may comprise sub-level cells $p_9$ to $p_{17}$. Thus, the nine additional sub-level cells $p_9$ to $p_{17}$ may be configured to store a subset of data derived from a respective, sub-level cell $p_0$.

In an embodiment, a user may desire to convert data displayed as a vertically configured, multi-level fractal grid into a horizontally configured, multi-level fractal grid (or vice-versa) by, for example, selecting an icon displayed on a GUI display labeled "convert".

Having described the configuration of vertically and horizontally configured multi-level fractal grids, we now turn our attention to a description of accessing data in such grids and manipulating the data.

In a first embodiment, to access the data in Level 0, 1 or 2 the user may input "0", "1" or "2" into the client or network device 2, 3 upon which the one or more processors within a respective device 2, 3 may be operable to retrieve executable instructions in order to access and retrieve the so configured data that corresponds to the specified level of a multi-level fractal grid from electronic storage devices 5, 6 and display such data on a display associated with devices 2, 3. For example, If Level 1 is specified, then the data may be displayed as nine exemplary cells $p_0$ to $p_8$, and if Level 2 is specified, then the data may be displayed as eighty-one exemplary cells, for example.

Alternatively, rather than input a number that corresponds to a level, a user may select a cell that is already displayed within a given level by, for example, clicking on a cell with an input device and GUI. Accordingly, the executable instructions may be triggered to display a different level of cells than the displayed level. For example, if a user clicks on a cell in Level 0 then the cells in Level 1 that correspond to the selected cell may be displayed. Similarly, if the cell clicked on is a Level 1 cell, then the cells in Level 2 that correspond to the selected cell may be displayed.

For example, if a user selects cell $p_1$ in FIG. 2B and the grid comprises a vertically configured, multi-level fractal grid then a device 2, 3 may be operable to complete executable instructions to access and display cells $m_{11}$ to $m_{18}$ in quadrant $Q_1$ as shown in FIG. 2C. However, if the grid comprises a horizontally configured, multi-level fractal grid then a device 2, 3 may be operable to complete executable instructions to access and display cells $p_{91}$ to $p_{17}$ in quadrant $Q_1$ as shown in FIG. 3C. In either method, a level of a fractal grid is displayed.

Figure 4:
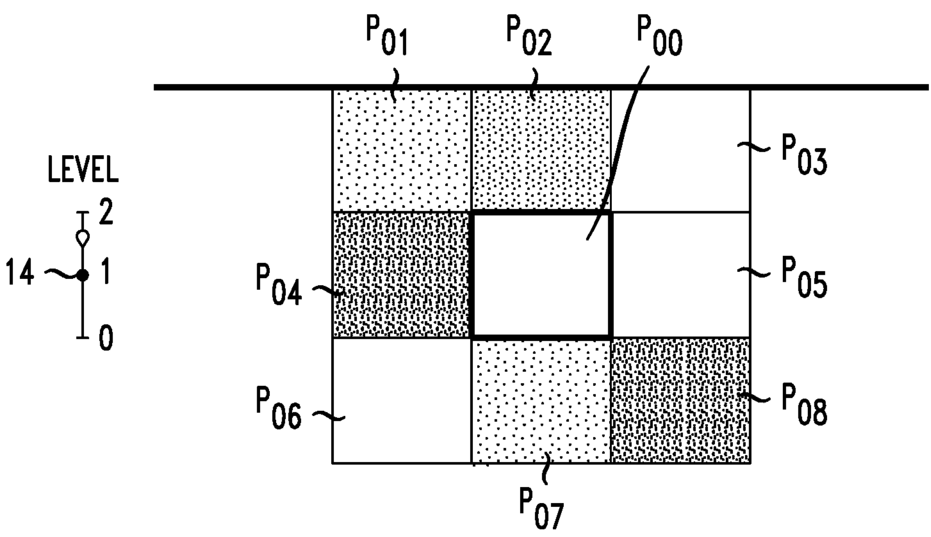
FIG. 4 depicts an exemplary fractal grid level indicator according to an embodiment of the present disclosure.

Still further, rather than input a level or select a cell to move from one level to another, a user may manipulate one or more indicators displayed on a display connected to a devices 2, 3 (or made a part of such a device) via an input device and GUI to move from one level to another. For example, referring now to FIG. 4 there is shown a fractal grid level indicator 14. In an embodiment, a user may move a cursor, or another GUI displayed symbol (not shown) over a portion of the indicator 14 upon which executable instructions may be operable to display the present level of a fractal grid (e.g., Level 1). Yet further by moving the indicator to a different position (e.g., up or down, left or right) a user may select a fractal grid at a different level (e.g., if the indicator is at Level 1, moving the indicator up selects Level 2). In sum, each position of the indicator 14 may correspond to a different level of a multi-level, fractal grid (and the completion of different executable instructions).

In more detail, in an embodiment, to retrieve a set of data from a cell each data set may be initially associated with one or more identification indices. For example, data to be associated with a cell located within an inner or outer quadrant may be associated with a "first" and "second" identification indices, where the first index indicates that the data may be in an inner or outer or inner quadrant and the second identification index may indicate the specific outer or inner quadrant where the data set resides. Accordingly, when the user inputs a level, selects a cell to move from one level to another, or manipulates one or more indicators to thereby select data within a cell, the executable instructions may be operable to convert the inputted level, cell or indicator to corresponding identification indices in order to retrieve the actual data form memory and display the data for the user. In this way, each set of data may be retrieved from a fractal grid.

The executable instructions within a device 2, 3 may be further structured into additional processes. For example, in one embodiment, one or more groups of the executable instructions may be structured to allow a user to change the format of a multi-level fractal grid within a respective device 2, 3 and/or a storage device 5, 6. In particular, the set of executable instructions may be structured to further control how data, that is stored within a cell, is displayed at any Level of a fractal grid.

For example, once data (e.g., text) is displayed in a cell, such as cells $p_0$ to $p_8$ in FIG. 2B, a user may manipulate an input device configured to work with a GUI to select the data (e.g., by clicking within the cell, or on the text, or by highlighting the text) which triggers the executable instructions configured as a "display editor" to change the format of data within a level of the multi-level fractal grid. For the reader's benefit, and for clarity, data whose format may be changed may be referred to herein as "first data".

Figure 6A:
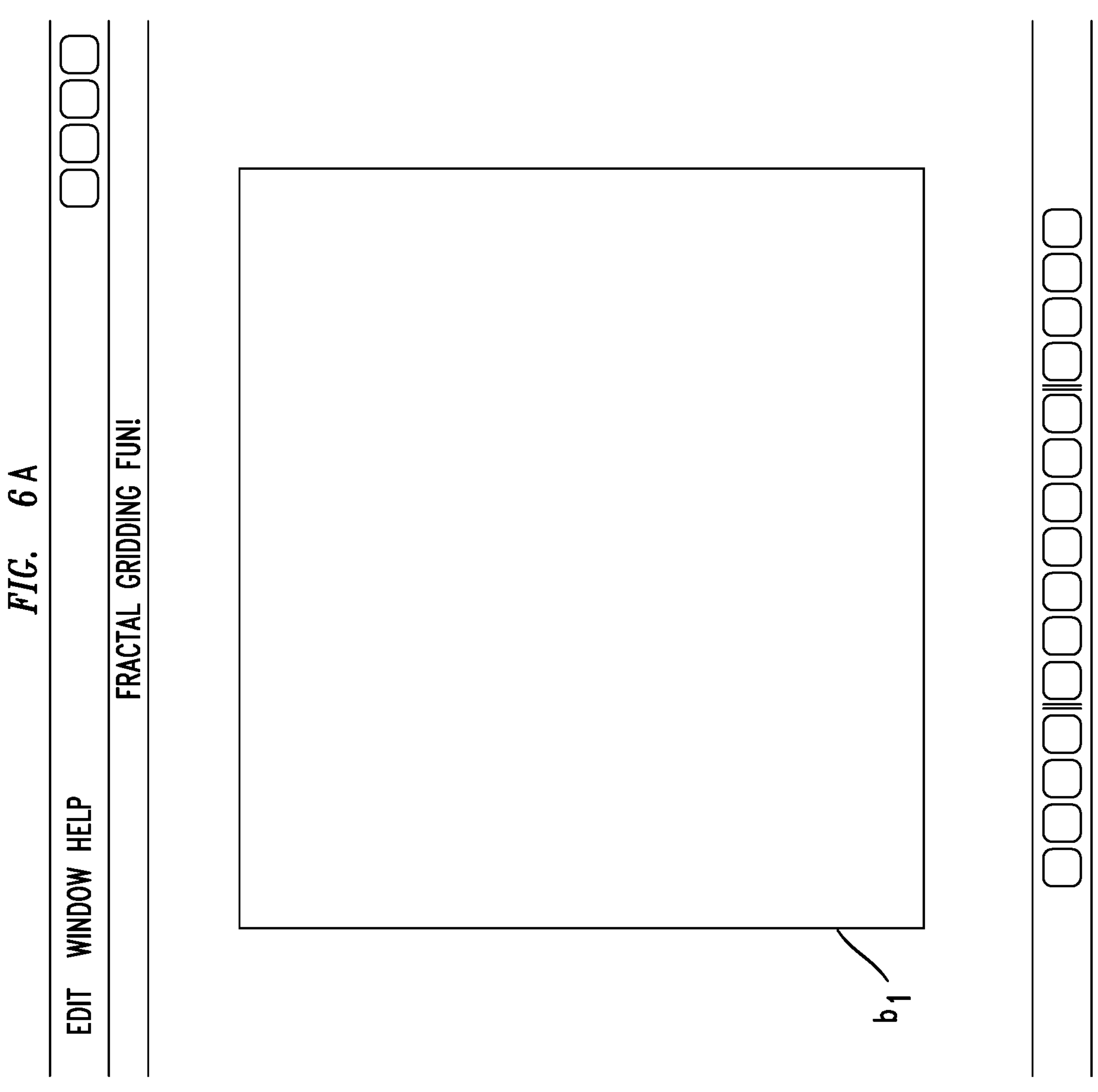
Figure 6C:
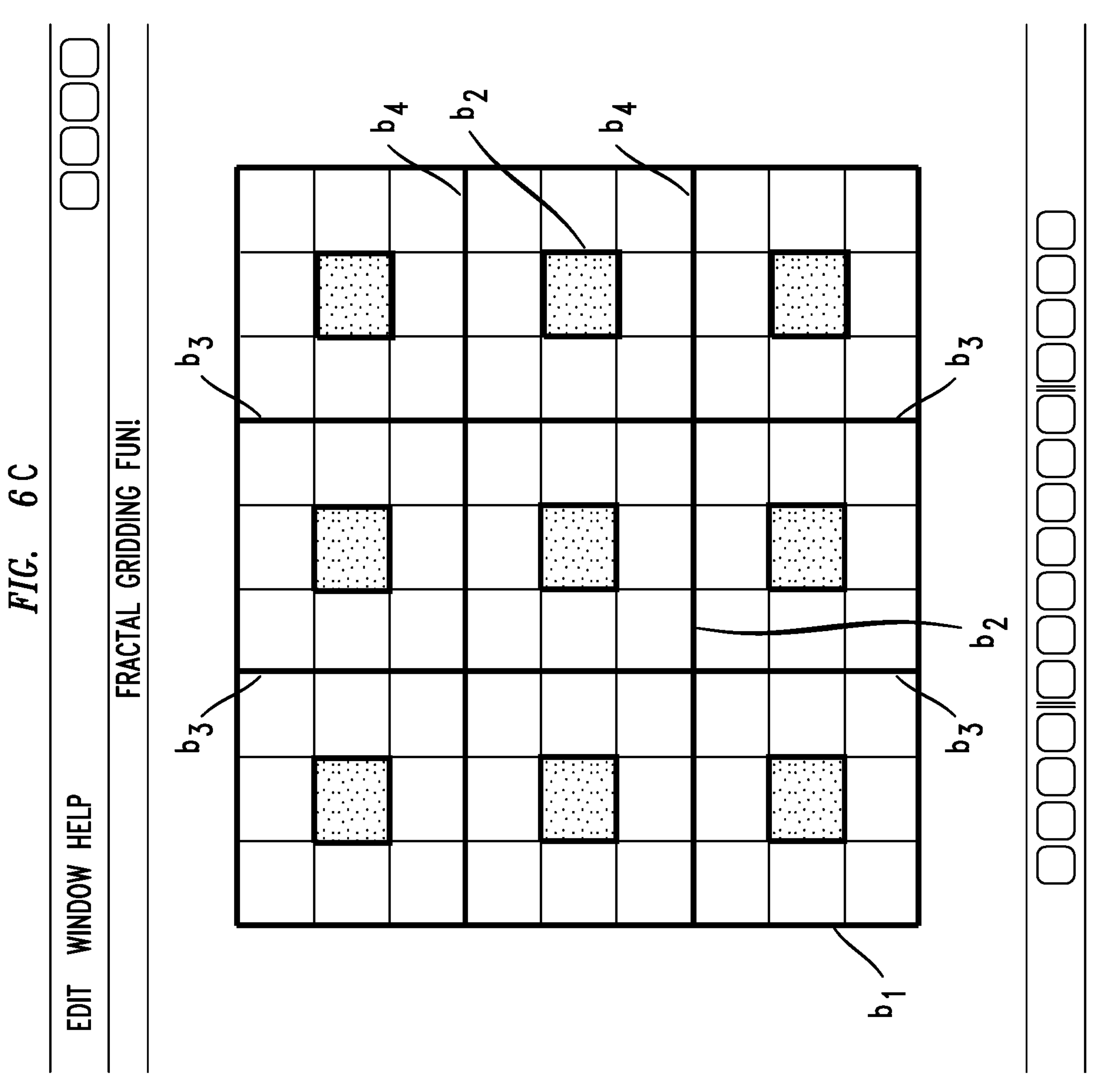
Figure 6D:
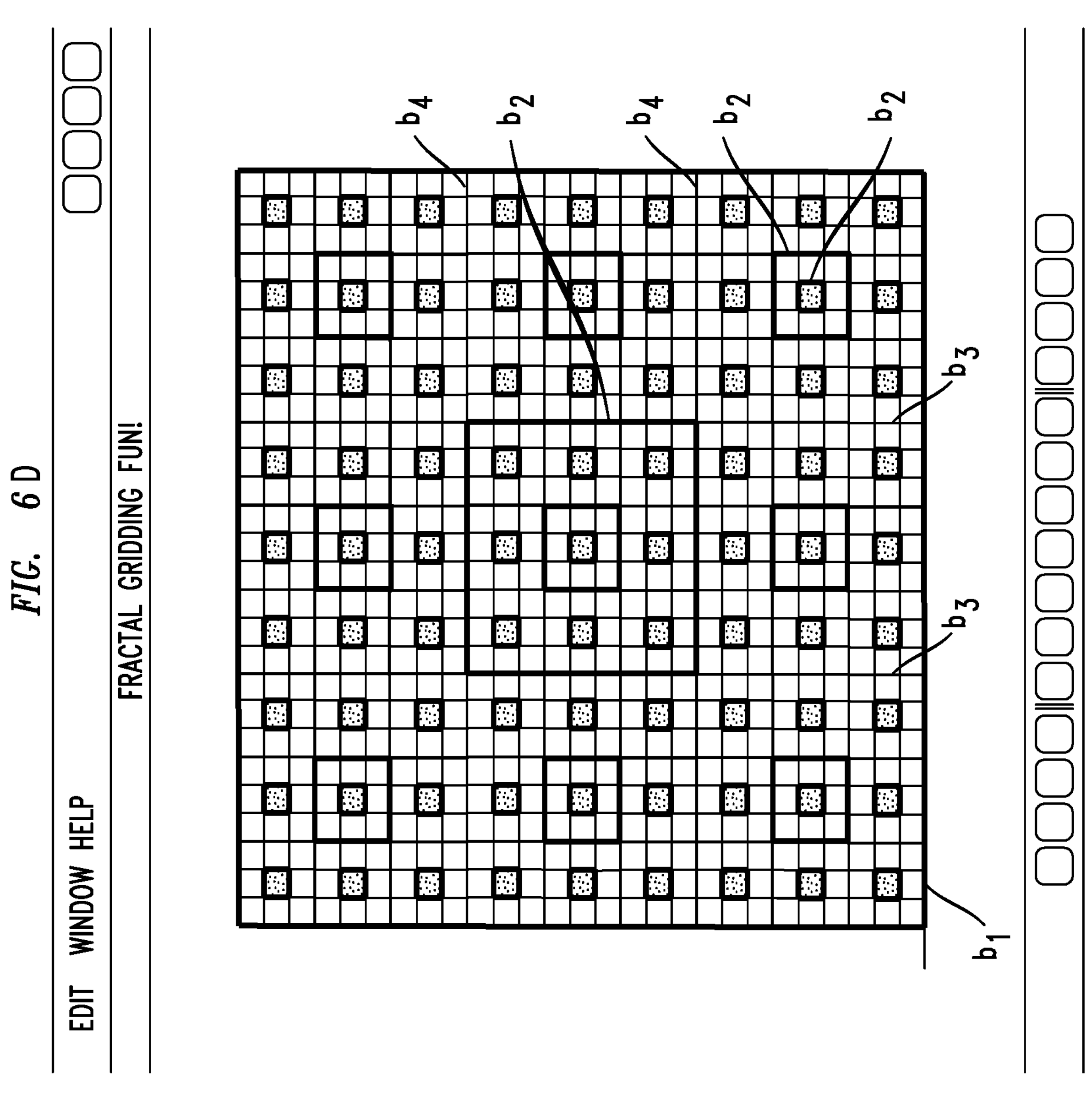
Figure 6F:
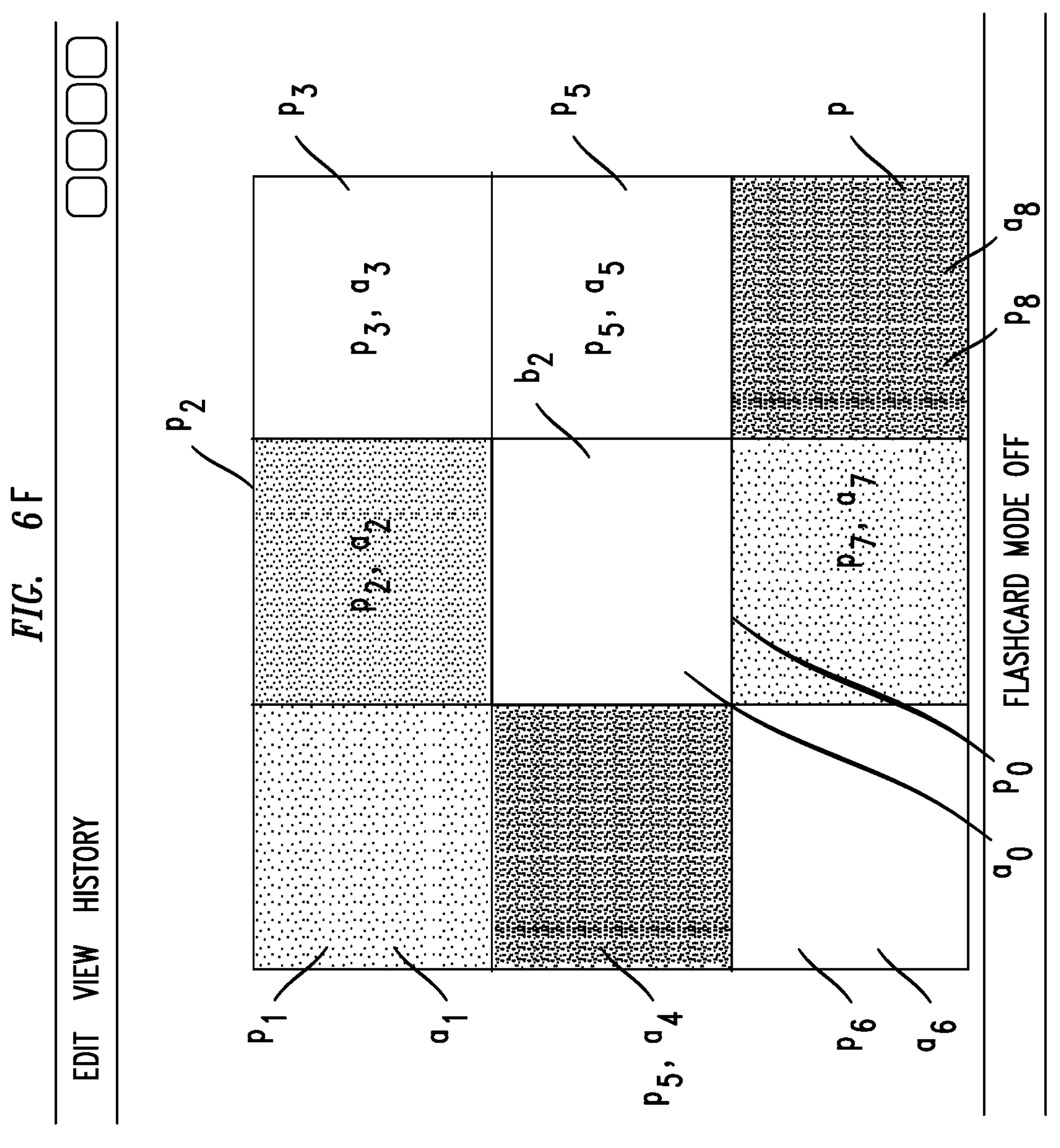
Figure 6G:
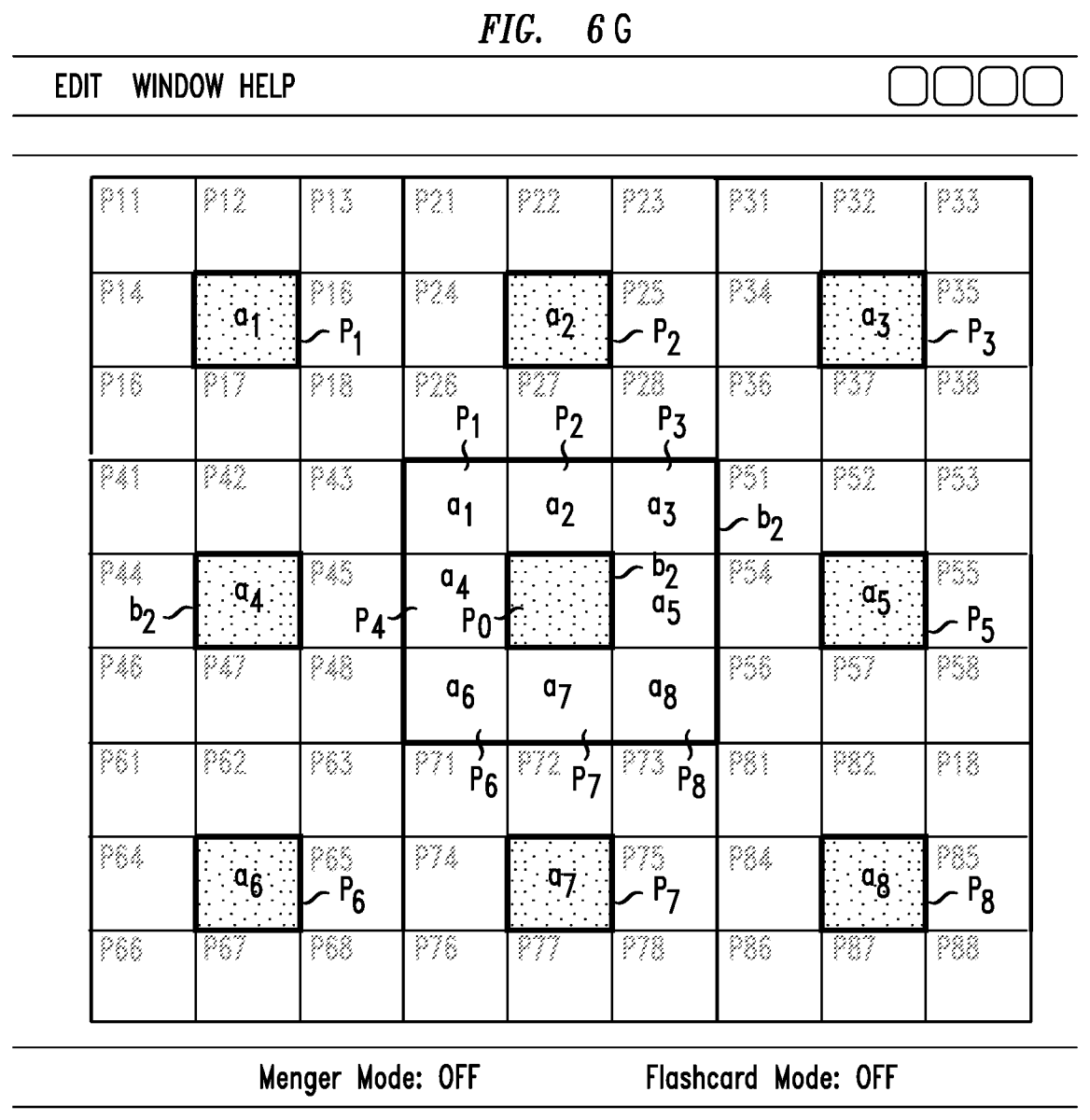

Such executable instructions may be triggered by the user via one or more input devices to complete the following exemplary processes to further change the format of the first data: (i) generate an outer boundary of a specified level of the multi-level fractal grid on a display and enhance or emphasize (e.g., lines may be made thicker, darker or vice-versa) the boundary (see boundary $b_1$ in FIGS. 6A to 6E and 6G); (ii) compute a length and width of an area to be displayed within an outer boundary of a given specified level of the multi-level fractal grid, divide the area into portions to accommodate the number of cells that correspond to the so specified level (see, for example, FIG. 6B and cells $p_0$ to $p_8$, e.g., the area is divided into thirds if the level specified is "1" to accommodate nine cells) and enhance or emphasize the horizontal and vertical lines of a central cell of the number of cells that correspond to the specified level (see boundaries $b_2$ in FIGS. 6B to 6G); (iii) enhance or emphasize one or more horizontal and vertical boundary lines separating the number of cells of the specified level (see boundaries $b_3$ and/or $b_4$ in FIGS. 6C to 6E, (iv) add a color to one or more areas of one or more cells separated by the boundary lines (i.e., enclosed by boundaries, see colored areas $a_0$ to $a_7$ in FIG. 6F associated with cells $p_0$ to $p_8$) where the colored areas (and colors) remain associated with a respective cell as the cell separated by the boundary lines as such a cell is displayed in different levels of the multi-level fractal grid (see, for example, the same colors in exemplary areas $a_0$ to $a_7$ of cells $p_0$ to $p_8$ in Level 1 in FIG. 6F and Level 2 in FIG. 6G), to name just a few of the many features of an exemplary fractal grid that may be enhanced or emphasized.

Thereafter, first data may be displayed within each generated cell/level and the first data within a specific cell, cells or level may also be enhanced or emphasized.

Once displayed, the data within a cell, or cells of an entire quadrant, (i.e., at starting positions) of a displayed level may be moved to another cell or cells within another quadrant of the same level by a user (i.e., to another, final position within the same level). To distinguish such data from "first data", data that may be moved may be referred to as "second data", it being understood that the first data and second data may be the same data that has undergone a change in format and movement.

For example, cells $m_{11}$ to $m_{18}$ in quadrant Q1 (referred herein as "first cells") shown in FIG. 2C may be moved from quadrant Q1 ("first quadrant") to another, different quadrant Q8 ("second quadrant") or any other quadrant. In more detail, one or more groups of the executable instructions may be structured to be triggered when a user manipulates an input device (keyboard, mouse, GUI) to move data ("second data") within a first cell (or cells of an entire first quadrant) of a level to second cell (or cells within a second quadrant) of the same level (i.e., data may be moved from one position within a displayed level to another position in the same level).

In yet another embodiment, if a user selects data displayed within a cell twice (hereafter "third data" of a selected, "third cell", e.g., by double clicking with an input device and GUI) the executable instructions structured as the display editor may be operable to display different data that is associated with the same selected cell (i.e., at least two different sets of data). In an embodiment, by "different" data is meant data that is not the same as the third data.

Similarly, a plurality of cells can be similarly selected to enable different electronic data to be displayed within the selected cells. Accordingly, the electronic storage devices 5, 6 may be configured to store a plurality of electronic data in a multi-level fractal grid, where the grid comprises at least a plurality of cells configured as one or more quadrants of a level of the multi-level fractal grid, and where each cell may store a plurality of different data, for example.

Collectively, each set of different data (within cells of an entire level of a grid) may represent a different "side" of a "card", thus enhancing the grid's usage for accessing and storing text (e.g., reminders, classroom notes, and/or instructions). For example, referring now to FIGS. 5A and 5B there are depicted two "sides" $s_1$ and $s_2$ ("first" and "second" sides) of the same level of a fractal grid 15. Each side $s_1$ and $s_2$ may comprise the same number of cells (referred to as 'side cells" for clarity, e.g., 9, 81), one of which has been labeled as a reference side cell, $c_{REF}$. In an embodiment, though the number of side cells may remain the same from one side $s_1$ to another $s_2$, the data within each side cell (i.e., associated with a side cell) may change from the first side $s_1$ to the second side $s_2$.

Figures 5A, 5B:
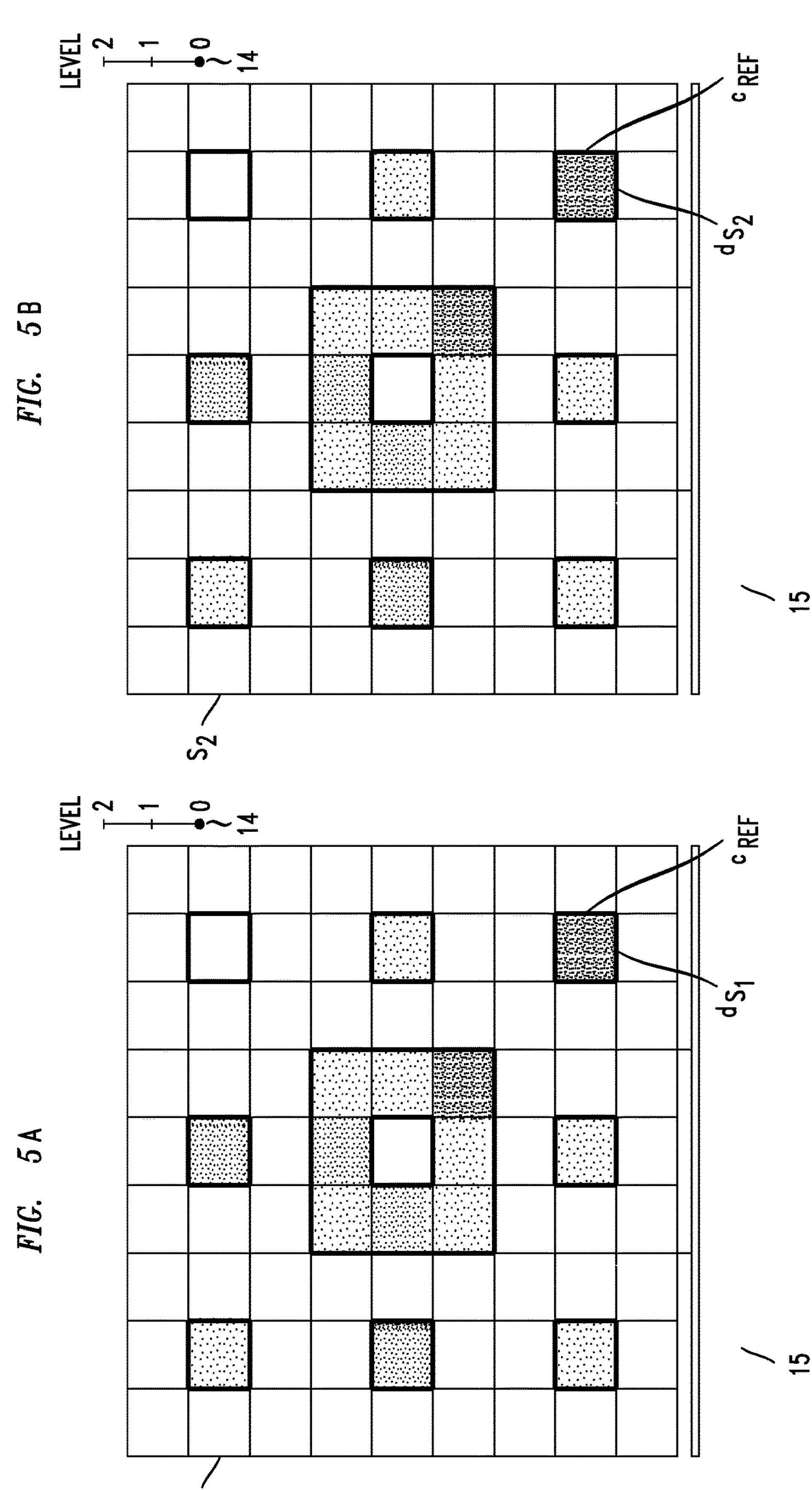
FIGS. 5A and 5B depict two different sides of the same fractal grid, each side associated with different data according to an embodiment of the present disclosure.

In more detail as illustrated in FIG. 5A (first side $s_1$) the reference side cell $c_{REF}$ may contain data $d_{s1}$ while in FIG. 5B (second side $s_2$) the data associated with the same side cell, $c_{REF}$ may be $d_{s2}$. Similarly, each side cell of one side $s_1$ (e.g., all side cells, or less than all side cells of one "side") may be associated with a different set of data than the same side cell on the opposite side, $s_2$. That said, a user may input, access or view the same data into the same side cell on both sides $s_1$ and $s_2$ if desired.

One application of the above-described "two-sided" fractal grid may be in recording, accessing or viewing educational notes. In more detail if the first side $s_1$ is presented to a user (e.g., a student) the user may input, access or view data (e.g., notes relating to a subject) associated with the side cells on side $s_1$. (e.g., data within cell $c_{REF}$). Thereafter, if the user double clicks on the same side cell (e.g., cell $c_{REF}$), for example, the executable instructions may be operable to associate different data with each and every side cell, including side cell $c_{REF}$, that is a part of the second side $s_2$ so that the user may input, access or view such different data.

Said another way, in one embodiment, a given level may comprise first and second sides $s_1$, $s_2$, where the first and second sides $s_1$, $s_2$ may each comprise a same number of side cells, and where electronic data within one or more side cells of the first side $s_1$ may differ from electronic data within one or more side cells of the second side $s_2$.

Alternatively, in another embodiment, a given level may comprise first and second sides $s_1$, $s_2$, where the first and second sides $s_1$, $s_2$ may each comprise a same number of side cells, and where electronic data within one or more side cells of the first side $s_1$ may be the same as electronic data within one or more side cells of the second side $s_2$.

Still further, additional executable instructions may be completed to add one or more image or video pixels to the displayed data so that a user may visually see the data change within the cell from one set of data to another as if the user was "flipping an index card" or using a "flashcard".

Another set of executable instructions may be structured to allow a user (when triggered) to manipulate the data (edit, delete, add, revise) at any Level of a fractal grid that has been previously displayed within a cell by selecting the data (e.g., manipulating one or more input devices such as a mouse, keyboard, GUI). This set of structured instructions may be referred to as a "modal editor", for example.

Figure 7:
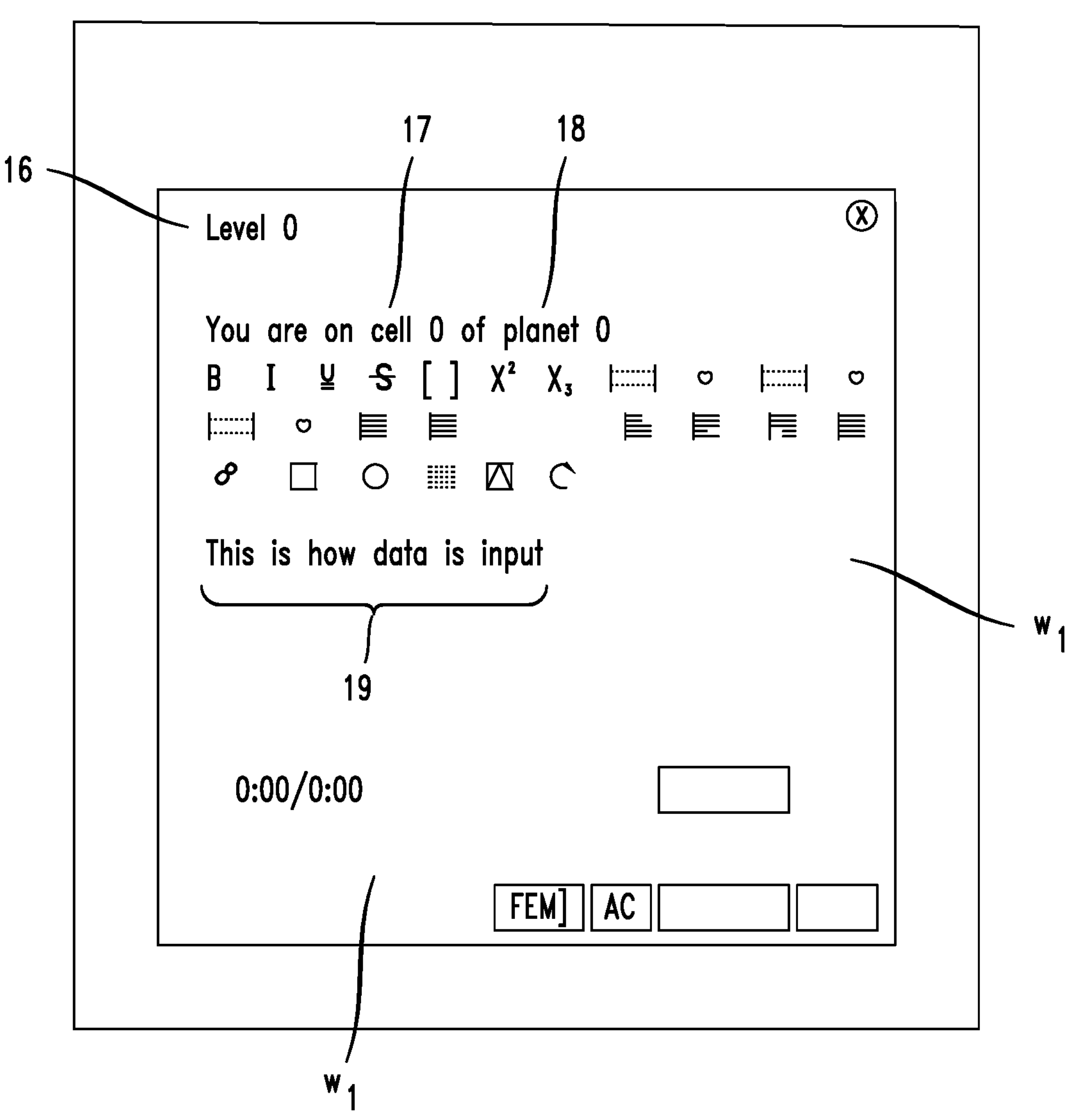
FIG. 7 depicts an exemplary illustration of how data may be input into one or more cells of an exemplary fractal grid according to an embodiment of the disclosure.

In addition to accessing and displaying data within multi-level fractal grids the present inventors also provide for methods and related devices that are configured to store data in such multi-level, fractal grids. In an embodiment, the one or more processors within a respective device 2, 3 may be operable to complete executable instructions to store data that is input by a user within one or more cells of a multi-level fractal grid. For example, referring to FIG. 7 there is displayed how data 19 may be input into one or more cells of an exemplary fractal grid according to an embodiment of the disclosure. As shown, once the user selects an icon indicating data input mode an exemplary input data window $w_1$ may be displayed. The window $w_1$ may include an indication of present fractal grid level 16, present fractal grid cell 17 and a user-provided named data set 18 that the data 19 may become associated with upon being input by the user. In an embodiment, the user may input the data 19 in the window $w_1$ using a keyboard, verbal commands or a GUI, for example.

Thereafter, to view the data 19 that has been stored with the cell 17 of the level 16 of a fractal grid the user may use the modal editor discussed herein or slider, for example (e.g., position a mouse over a slider) to select the data 19 for editing, deletion or other functions.

As mentioned previously, at least two different sets of data associated with the same cell may be displayed (i.e., "flipping" a cell). To store such data a user may use an input device (e.g., keyboard, GUI) that triggers executable instructions to receive data input by the user and send the input data to two at least different "editor" arrays of data in the electronic storage devices 5, 6, for example. A "first" editor array may store data that may be eventually displayed as one "side of a cell" and a second editor array may store data that may be eventually displayed as a second "side of the cell", for example.

In an embodiment, each of the editor arrays may be configured as a Level 2 representation of the whole grid which allows a plurality of data to be stored, and then accessed, as one "portable" array (i.e., the data can be reproduced, copied or transferred from one grid to another because of the Level 2 representation).

In more detail, in an embodiment, each editor array may represent an outer grid of a Level 2 representation. Accordingly, for example, Level 1 can be represented by the center grid of Level 2 and Level 0 can be represented by the center element of Level 1's array.

Yet further, each editor array may comprise a plurality of sub-arrays. For example, the sub-arrays may be designated as "inner" arrays that are configured to store data in a Level 1 configuration that allows a user to concurrently change the data in an outer cell and an inner center cell within a Level 2 fractal grid while at the same time persisting through Levels 1 and 0 (i.e., changes made to data within Level 1 continue and are presented at Level 2 and Level 0, changes made to data at Level 2 continue and are presented at Levels 1 and 0, and changes made to data at Level 0 continue and are presented at Levels 1 and 2).

In an embodiment, one of the inner arrays (referred to herein as an "outer array" of an inner array) may first receive data input by a user. Thereafter, the executable instructions may be operable to move an amount of the received, inputted data from the outer array into one or more inner arrays.

In an embodiment, the number of inner arrays may be configured by the executable instructions based on input previously received from the user. For example, if the user desires nine cells (Level 1) then the instructions are operable to form nine inner arrays to receive some part off the data from the outer arrays. Said another way, each inner array may be configured to store an amount of data for a specific cell of a level of a multi-level fractal grid.

The claim language that follows below is incorporated herein by reference in expanded form, that is, hierarchically from broadest to narrowest, with each possible combination indicated by the multiple dependent claim references described as a unique standalone embodiment.

While benefits, other advantages, and solutions to problems have been described above regarding specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

We claim:

1. A method of structuring data within an electronic storage device as a multi-level fractal grid, comprising:

receiving input data at the electronic storage device, associating the input data with a selected cell of a specified level of the multi-level fractal grid, the cell being one of a plurality of cells arranged in accordance with a recursive fractal grid structure, storing, by one or more electronic processors, first data derived from the input data in a first data structure corresponding to a first side of the selected cell, storing, by the one or more electronic processors, second data derived from the input data in a second data structure corresponding to a second side of the selected cell wherein, the first data structure and the second data structure together comprise a two-sided data representation of the selected cell such that the selected cell is representative of a flashcard having different data associated with each of the first and second sides, the first data structure comprises a first editor array, and the second data structure comprises a second editor array, the first editor array is configured to store data associated with the first side of the selected cell and the second editor array is configured to store data associated with the second side of the selected cell, and maintaining an association between the first data structure and the second data structure such that both the first data and the second data are retrievable using a common cell identifier corresponding to the selected cell, the common cell identifier comprising one or more indices corresponding to a level and position within the multi-level fractal grid.

2. The method of claim 1, wherein each of the first and second editor arrays comprises a plurality of sub-arrays corresponding to sub-level cells of the multi-level fractal grid.

3. The method of claim 1, wherein the first data differs from the second data.

4. The method of claim 1, wherein the first data is the same as the second data.

5. The method of claim 1 further comprising receiving a user input selecting the selected cell, and in response, retrieving either the first data or the second data associated with the selected cell to represent flipping of the flashcard.

6. A system comprising:

one or more electronic processors; and one or more electronic memories storing executable instructions that, when executed, cause the one or more processors to:

receive input data, associate the input data with a selected cell of a specified level of the multi-level fractal grid, the cell being one of a plurality of cells arranged in accordance with a recursive fractal grid structure, store first data derived from the input data in a first data structure corresponding to a first side of the selected cell, store second data derived from the input data in a second data structure corresponding to a second side of the selected cell wherein, the first data structure and the second data structure together comprise a two-sided data representation of the selected cell such that the selected cell is representative of a flashcard having different data associated with each of the first and second sides, the first data structure comprises a first editor array, and the second data structure comprises a second editor array, the first editor array is configured to store data associated with the first side of the selected cell and the second editor array is configured to store data associated with the second side of the selected cell, and maintain an association between the first data structure and the second data structure such that both the first data and the second data are retrievable using a common cell identifier corresponding to the selected cell, the common cell identifier comprising one or more indices corresponding to a level and position within the multi-level fractal grid.

7. The system of claim 6, wherein each of the first and second editor arrays comprises a plurality of sub-arrays corresponding to sub-level cells of the multi-level fractal grid.

8. The system of claim 6, wherein the first data differs from the second data.

9. The system of claim 6, wherein the first data is the same as the second data.

10. The system of claim 6 wherein the one or more processors is further caused to receive a user input selecting the selected cell, and in response, retrieve either the first data or the second data associated with the selected cell to represent flipping of the flashcard.

* * * * *